(12) United States Patent
Strogen

(10) Patent No.: US 11,926,292 B1
(45) Date of Patent: Mar. 12, 2024

(54) MOTORIZED LANDING GEAR FOR A TRACTOR TRAILER

(71) Applicant: Ricky Strogen, Midlothian, TX (US)

(72) Inventor: Ricky Strogen, Midlothian, TX (US)

( * ) Notice: Subject to any disclaimer, the term of this patent is extended or adjusted under 35 U.S.C. 154(b) by 777 days.

(21) Appl. No.: 17/034,716

(22) Filed: Sep. 28, 2020

Related U.S. Application Data

(60) Provisional application No. 62/906,809, filed on Sep. 27, 2019.

(51) Int. Cl.
| | |
|---|---|
| *B60S 9/04* | (2006.01) |
| *B60R 16/00* | (2006.01) |
| *F16H 1/14* | (2006.01) |
| *H01H 21/22* | (2006.01) |
| *H02K 5/22* | (2006.01) |
| *H02K 7/116* | (2006.01) |
| *H02K 11/28* | (2016.01) |

(52) U.S. Cl.
CPC .............. *B60S 9/04* (2013.01); *B60R 16/005* (2013.01); *F16H 1/14* (2013.01); *H01H 21/22* (2013.01); *H02K 5/225* (2013.01); *H02K 7/116* (2013.01); *H02K 11/28* (2016.01); *H02K 2213/06* (2013.01)

(58) Field of Classification Search
CPC ...... B60S 9/04; B60S 9/00; B60S 9/02; B60R 16/005; F16H 1/14; F16H 1/00; H01H 21/22; H02K 5/225; H02K 5/22; H02K 5/04; H02K 5/00; H02K 7/116; H02K 11/28; H02K 11/00; H02K 11/20; H02K 2213/06
See application file for complete search history.

(56) References Cited

U.S. PATENT DOCUMENTS

| | | | |
|---|---|---|---|
| 2,959,395 A | 11/1960 | Strack et al. | |
| 3,136,527 A | 6/1964 | Leroy | |
| 3,402,915 A | 9/1968 | Dalton | |
| 4,097,840 A * | 6/1978 | Chappelle | B60S 9/04 280/766.1 |
| 4,863,184 A * | 9/1989 | Mena | B60S 9/08 254/419 |
| 6,224,103 B1 | 5/2001 | Hatcher | |
| 6,260,882 B1 | 7/2001 | Kingsbury | |
| 6,481,749 B2 * | 11/2002 | Ahlers | E02F 9/085 280/764.1 |
| 6,896,289 B2 * | 5/2005 | Gross | B60S 9/08 254/419 |
| 6,926,305 B2 * | 8/2005 | Daniel | B60S 9/08 254/419 |
| 7,311,331 B2 * | 12/2007 | McGlothlin | B60D 1/66 280/765.1 |
| 8,051,545 B2 * | 11/2011 | Peveler | B60S 9/08 29/434 |
| 8,827,309 B1 * | 9/2014 | Ouellet | B60S 9/08 280/763.1 |

(Continued)

*Primary Examiner* — James M Dolak
(74) *Attorney, Agent, or Firm* — Cramer Patent & Design PLLC; Aaron R. Cramer

(57) ABSTRACT

A motorized landing gear for a tractor trailer is located near the manual operation crank of the landing gear. The drive motor is powered by a plug in mechanical communication with a power source and actuated by a switch which may be double-pole/double-throw toggle switch secured adjacent the crank. The motorized landing gear may be provided with a protective all-weather covering.

14 Claims, 6 Drawing Sheets

(56) References Cited

U.S. PATENT DOCUMENTS

| | | | |
|---|---|---|---|
| 8,944,467 B1 * | 2/2015 | Dill | B60S 9/08 |
| | | | 280/766.1 |
| 9,937,902 B2 * | 4/2018 | Klassy | B60S 9/08 |
| 10,807,571 B1 * | 10/2020 | Myrex | B60S 9/22 |
| 10,894,532 B2 * | 1/2021 | McCarthy | B60S 9/08 |
| 11,014,541 B2 * | 5/2021 | Conaway | B60S 9/12 |
| 11,059,461 B2 * | 7/2021 | Laarman | B60D 1/66 |
| 11,377,074 B2 * | 7/2022 | Beik | B60S 9/08 |
| 2002/0053794 A1 | 5/2002 | Fender | |
| 2003/0209896 A1 | 11/2003 | Daniel | |
| 2006/0119089 A1 * | 6/2006 | Rivers | B60S 9/08 |
| | | | 280/763.1 |
| 2009/0008917 A1 * | 1/2009 | Daniel | B60S 9/06 |
| | | | 254/419 |

* cited by examiner

MOTORIZED LANDING GEAR FOR A TRACTOR TRAILER

RELATED APPLICATIONS

The present invention is a continuation of U.S. Provisional Application No. 62/906,809 filed on Sep. 27, 2019, the entire disclosures of which are incorporated herein by reference.

FIELD OF THE INVENTION

The present invention relates generally to a motorized landing gear for a tractor trailer.

BACKGROUND OF THE INVENTION

There are countless tractor-trailer trucks that crisscross our country every day. One (1) aspect of their operation that most of the general public does not see is the procedure of disconnecting the trailer from the tractor at loading docks, factories and shipping centers. One (1) portion of this procedure is the lowering of the landing gear on the trailer.

The landing gear is the supporting mechanism which holds the trailer in an upright position when not connected to the tractor. A hand crank is typically used to perform this procedure, but this crank requires many turns to completely raise or lower the gear, thus translating into increased time and effort on the driver's part. This time and effort directly translate into lost revenue for the driver who must spend extra time operating the crank instead of driving. Accordingly, there exists a need for a means by which the landing gear on trailers can be raised or lowered in a quick and automatic, yet safe method. The development of the electric operating device for trailer landing legs fulfills this need.

SUMMARY OF THE INVENTION

The principles of the present invention provide for an electric operating device which has a trailer which in turn has a side and a landing gear assembly. The landing gear assembly includes a driver's side support leg and a right-side support leg that are interconnected by a drive shaft. The electric operating device also comprises a drive motor housing which is adapted to be disposed at an upper side of a driver's side support leg. The drive motor housing is adjacent to a hand crank. The electric operating device also has a control switch station which is mounted on the side of the trailer directly above the landing gear assembly, a weatherproof cover which provides environmental protection for the control switch station, a standard electrical umbilical connection which provides electrical power for the electric operating device, and a wiring connection which is electrically connected to the drive motor housing. The wiring connection provides for electrical energization of the electric operating device.

The trailer may be selected from the group selected from a flatbed trailer, a tanker trailer, a car carrier, or a specialty trailer. The driver's side support leg and the right-side support leg may include an extendable foot. The drive shaft may ensure that both of the extendable feet extend up and down along a first travel path simultaneously and in an equal manner. The drive motor housing may provide for driving the extendable feet along the first travel path in the same manner as the hand crank connected to the hand crank coupling located at the hand crank. The hand crank may be connected to the hand crank coupling drive the extendable foot to allow for backup redundant operation. The hand crank may be connected to the DC electric motor to allow for backup redundant operation.

The driver's side support leg may be provided with a main bevel gear which may be axially connected to the extendable foot to allow for motion along the first travel path. The main bevel gear may be driven by first drive bevel gear that is axially connected to the hand crank coupling. The main bevel gear may be driven by first drive bevel gear that is axially connected to a second drive bevel gear that is connected to a DC electric motor located inside of the drive motor housing. The control switch station may be capable of being mounted on the side of the trailer directly above in the tractor hauling the trailer. The control switch station may be mounted on a dashboard of the trailer. The control switch station may be provided with a weatherproof housing that houses a double-pole/double-throw toggle switch.

The double-pole/double-throw toggle switch may be envisioned to be a spring return-to-center OFF position. The double-pole/double-throw toggle switch may be provided in an UP position which raises the extendable foot, an OFF position which holds the extendable foot at a position they are at when the double-pole/double-throw toggle switch is placed in the OFF position, and a DOWN position which lowers the extendable foot.

The UP position and the DOWN position may require the double-pole/double-throw toggle switch to be held in its respective position. The internal spring of the double-pole/double-throw toggle switch may place it in the OFF position. The weatherproof cover may swing along a radial travel path which may be raised up for access and gravity will hold the weatherproof cover in a downward position to protect the double-pole/double-throw toggle switch from one or more external elements when not in use. An output bevel gear may be axially connected to the drive shaft to allow for common equal driving of the extendable foot associated with the right-side support leg. The standard electrical umbilical connection may provide electrical power for a wide range of trailers and for a connected truck in a universal and interchangeable manner.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
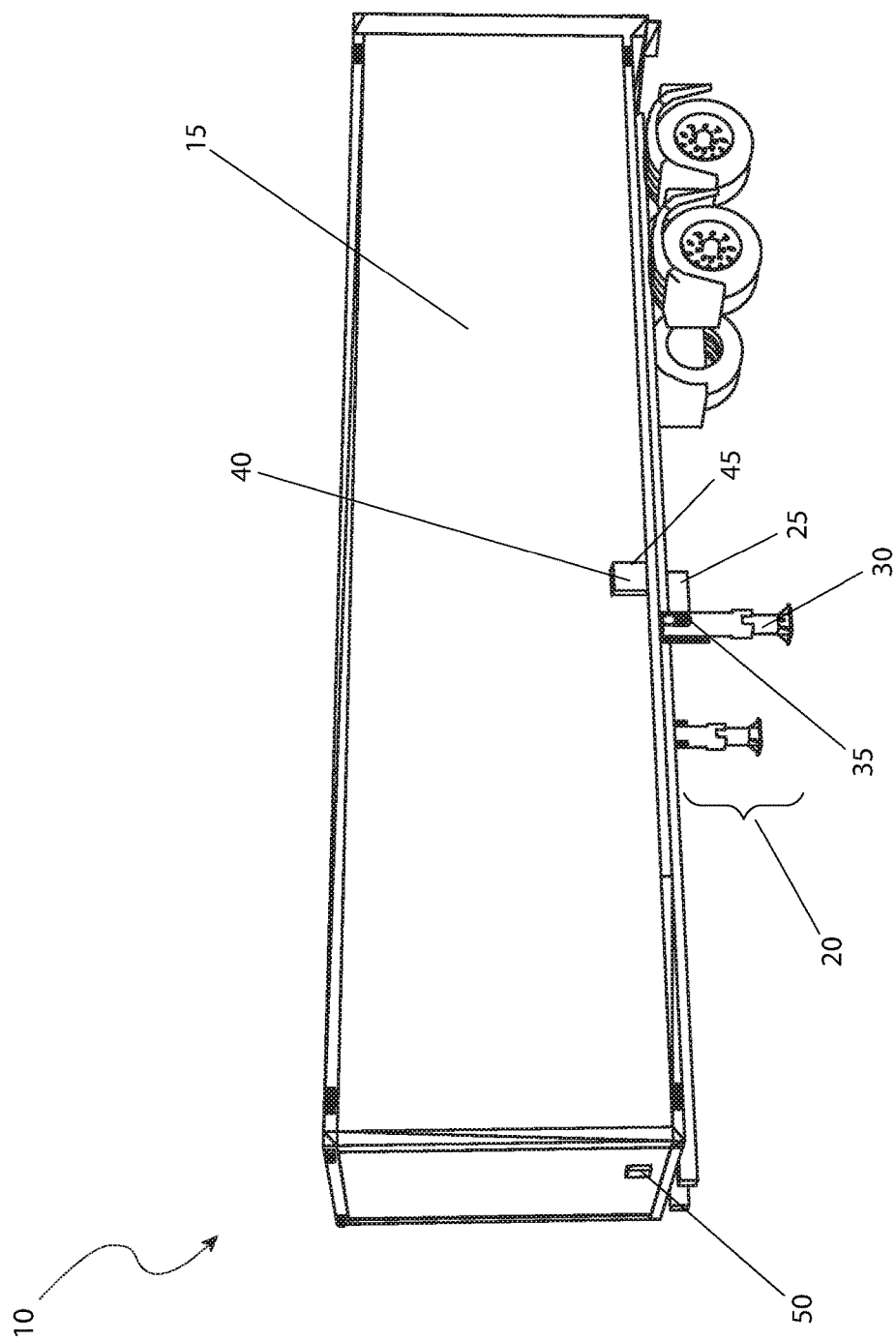
FIG. 1 is a perspective view of the electric operating device for landing gear assemblies, shown in an installed state on a trailer, according to the preferred embodiment of the present invention.

DESCRIPTIVE KEY 10 electric operating device
14 tractor
15 trailer
20 landing gear assembly
25 drive motor housing
30 driver's side support leg
35 hand crank
40 control switch station
45 weatherproof cover
50 electrical umbilical connection
55 right side support leg
60 drive shaft
65 extendable foot
70 first travel path "1"
75 hand crank coupling
80 wiring connection
85 main bevel gear
90 first drive bevel gear
95 second drive bevel gear
100 DC electric motor
105 output bevel gear
110 weatherproof housing
115 double-pole/double-throw toggle switch
120 radial travel path "2"
125 UP position
130 OFF position
135 DOWN position

1. Description of the Invention

The best mode for carrying out the invention is presented in terms of its preferred embodiment, herein depicted within FIGS. 1 through 6. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

2. Detailed Description of the Figures

Referring now to FIG. 1, a perspective view of the electric operating device for trailer landing legs 10, shown in an installed state on a trailer 15, according to the preferred embodiment of the present invention is disclosed. The electric operating device (herein also described as the "device") 10, includes multiple electrical/mechanical components that are permanently attached to a trailer 15. The trailer 15 is depicted as a conventional cargo trailer for purposes of illustration. The benefits of the device 10 can be visualized on a wide range of trailer styles, including, but not limited to: flatbed trailers, tanker trailers, car carriers, specialty trailers, and the like. The teachings of the present invention can be applied to any trailer 15 equipped with a landing gear assembly 20. As such, the use of the device 10 is not limited to any specific type of trailer 15.

Figure 5:
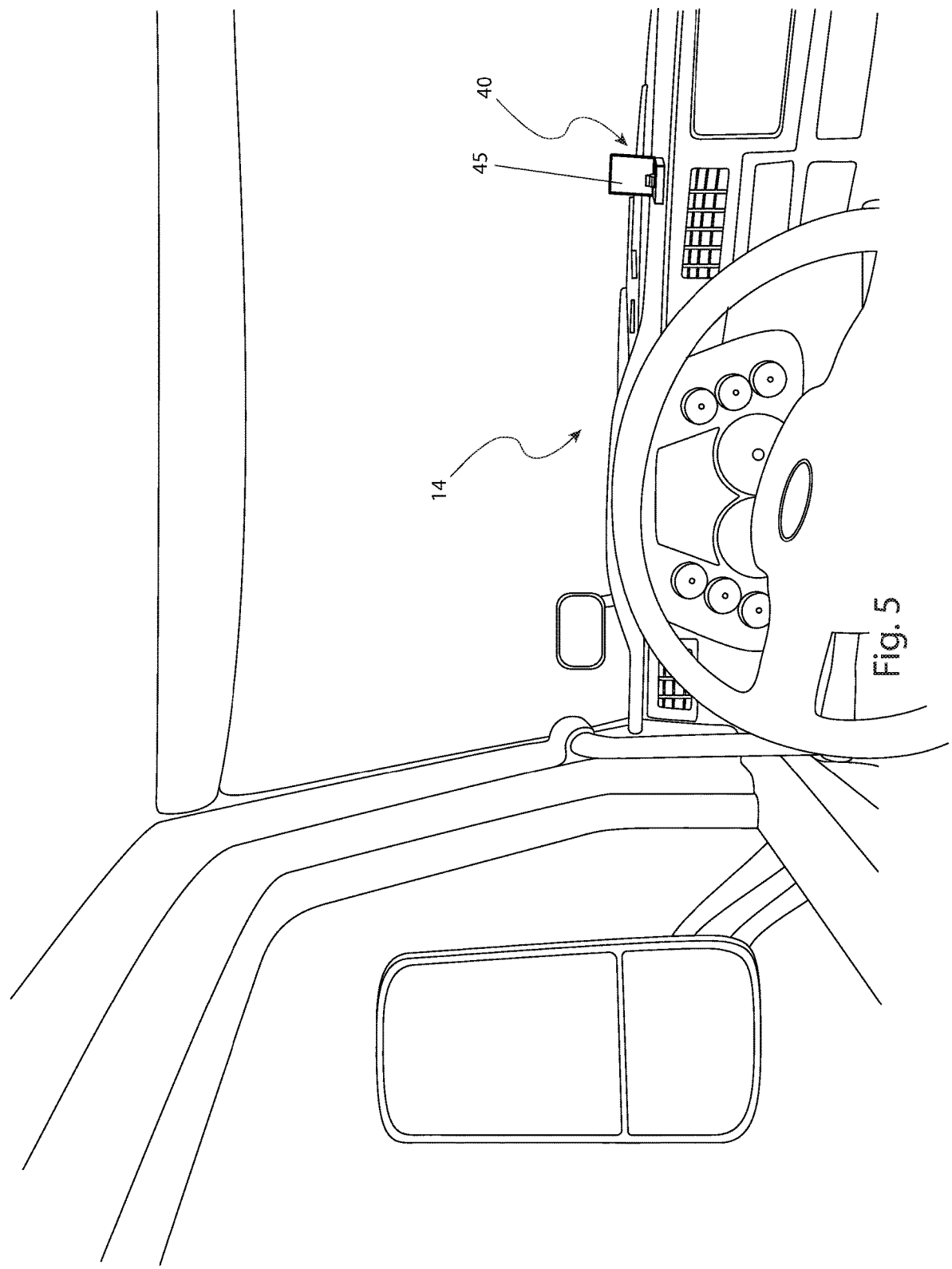
FIG. 5 is an environmental view control switch station shown in an installed state in a tractor, according to the preferred embodiment of the present invention.

A drive motor housing 25 is directly visible at the upper side of the driver's side support leg 30, adjacent to the hand crank 35. Further description of the drive motor housing 25 will be provided herein below. A control switch station 40 is capable of being mounted on the side of the trailer 15 directly above the landing gear assembly 20 (as seen in FIG. 1), or in the tractor 14 hauling the trailer 15, such as on a dashboard (as seen in FIG. 5). A weatherproof cover 45 provides environmental protection for the control switch station 40. Further description of the control switch station 40 will be provided herein below. Electrical power for the device 10 is provided through the standard electrical umbilical connection 50 and is thus acceptable for use on a wide range of trailers 15 as well as any connected trucks in a universal and interchangeable manner.

Figure 2:
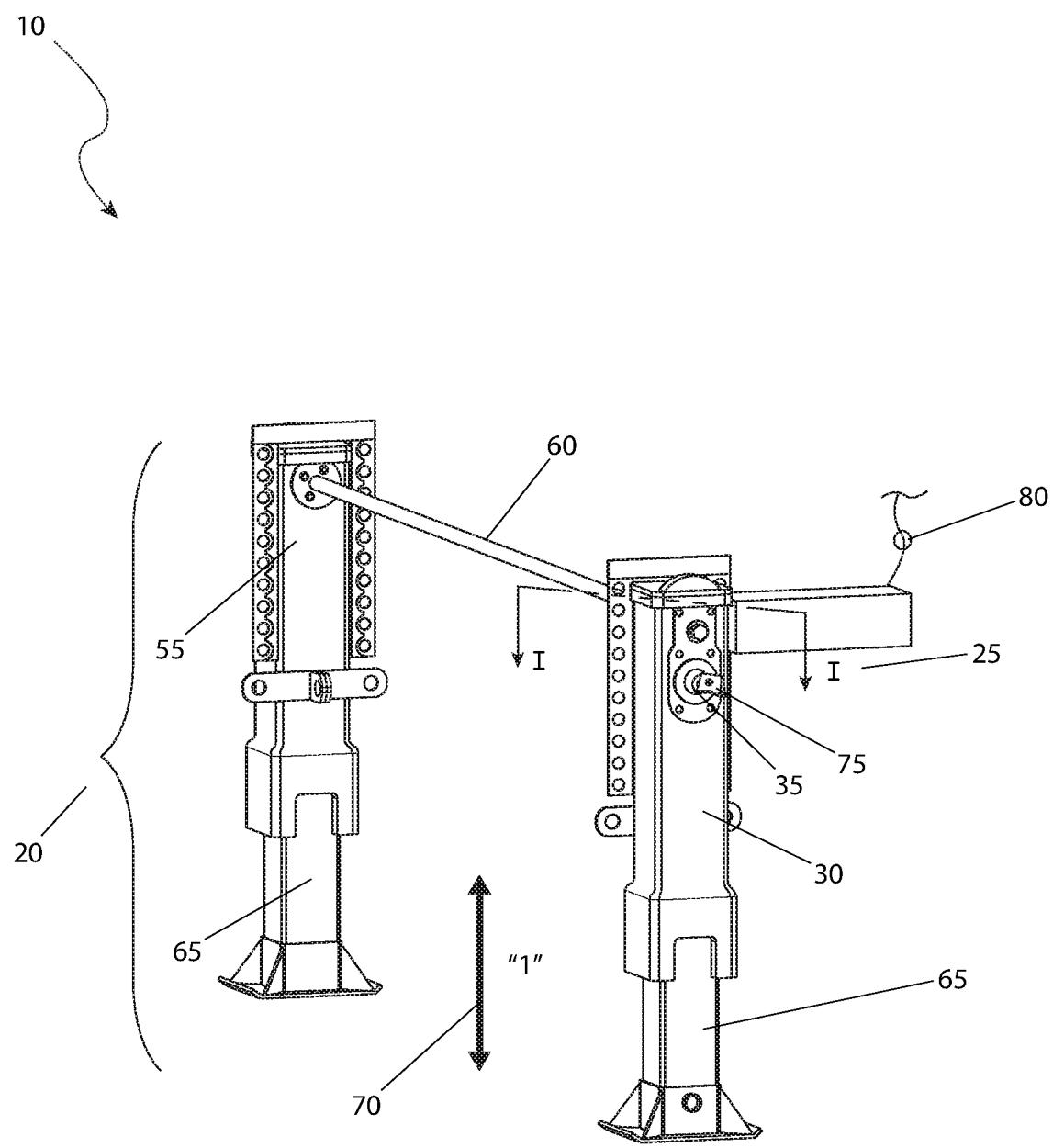
FIG. 2 is an isometric view of the landing gear assembly, as part of the electric operating device, according to the preferred embodiment of the present invention.

Referring next to FIG. 2, an isometric view of the landing gear assembly 20, as part of the device 10, according to the preferred embodiment of the present invention is depicted. The landing gear assembly 20 includes the driver's side support leg 30 as well as the right-side support leg 55, as interconnected by a drive shaft 60. Both the driver's side support leg 30 and the right-side support leg 55 are both provided with an extendable foot 65. The drive shaft 60 ensures that both extendable feet 65 extend up and down along a first travel path "1" 70 simultaneously and in an equal manner. The drive motor housing 25 provides for driving the extendable feet 65 along the first travel path "1" 70 in the same manner as the hand crank connected to the hand crank coupling 75 located at the hand crank 35. Further description of the mechanical connection between the drive motor housing 25 and the driver's side support leg 30 will be provided herein below. A wiring connection 80, electrically connected to the drive motor housing 25, provides for electrical energization of the device 10. Further description of the electrical circuitry utilized by the device 10 will be provided herein below. It is noted that the specific size and style of the landing gear assembly 20 is merely representative of the many multiple styles of such systems available today. The specific teachings of the device 10 are readily adaptable to all styles of landing gear assemblies 20, and as such, the specific style of device 10 as are presented by FIG. 2 is not intended to be a limiting factor of the present invention.

Figure 3:
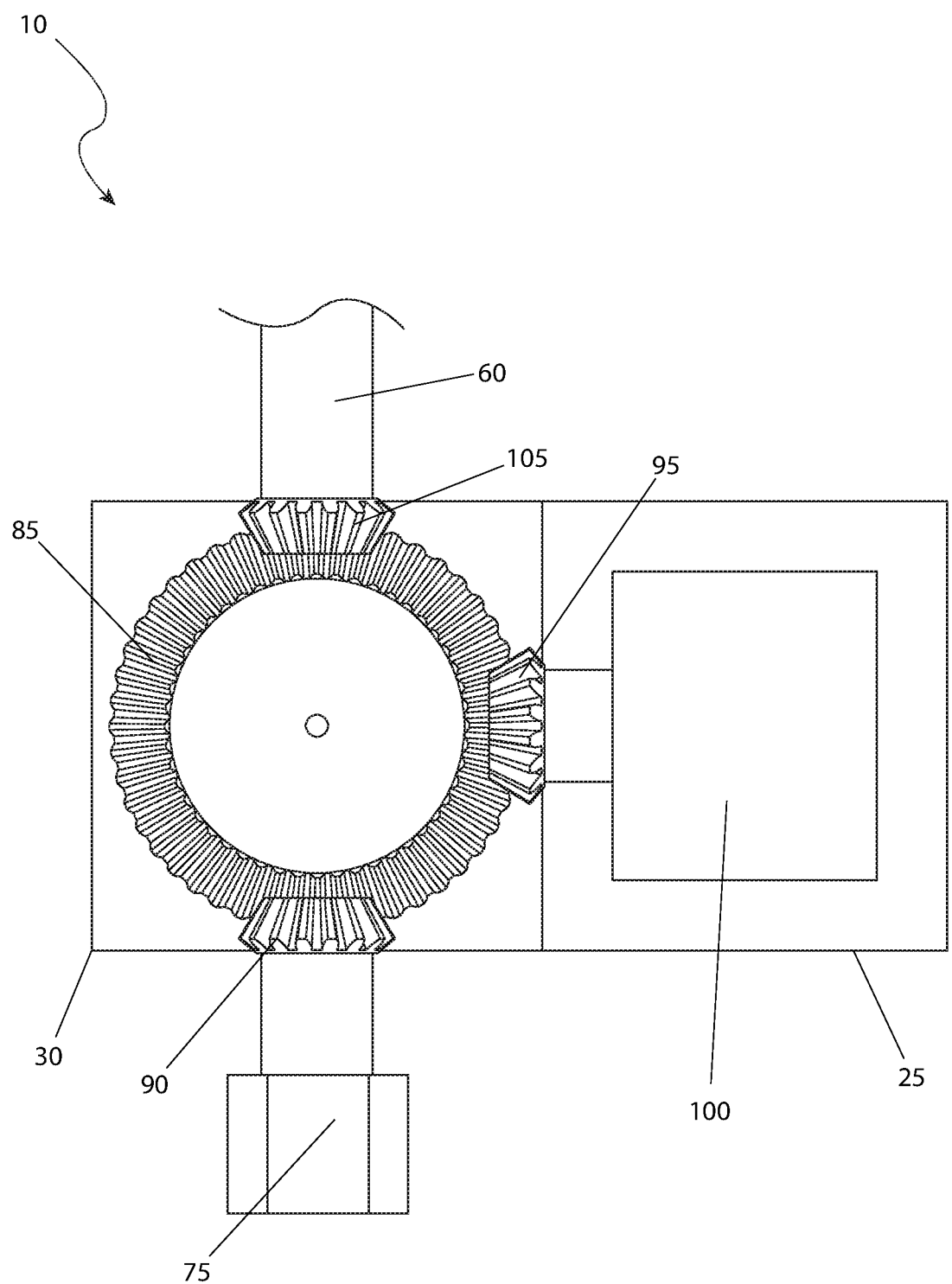
FIG. 3 is a sectional view of the electric operating device, as seen along a line I-I, as shown in FIG. 2, according to the preferred embodiment of the present invention.

Referring now to FIG. 3, a sectional view of the device 10, as seen along a line I-I, as shown in FIG. 2, according to the preferred embodiment of the present invention is shown. The driver's side support leg 30 is provided with a main bevel gear 85 which is axially connected to the extendable foot 65 (as shown in FIG. 2) to allow for motion along the first travel path "1" 70 (as shown in FIG. 1). The main bevel gear 85 may be driven by first drive bevel gear 90 that is axially connected to the hand crank coupling 75 or by a second drive bevel gear 95 that is connected to a DC electric motor 100 located inside of the drive motor housing 25. In such a manner, either a hand crank connected to the hand crank coupling 75 or the DC electric motor 100 may drive the extendable foot 65, thus allowing for backup redundant operation. Additionally, an output bevel gear 105 is axially connected to the drive shaft 60 to allow for common equal driving of the extendable foot 65 associated with the right-side support leg 55 (as shown in FIG. 2).

Figure 4:
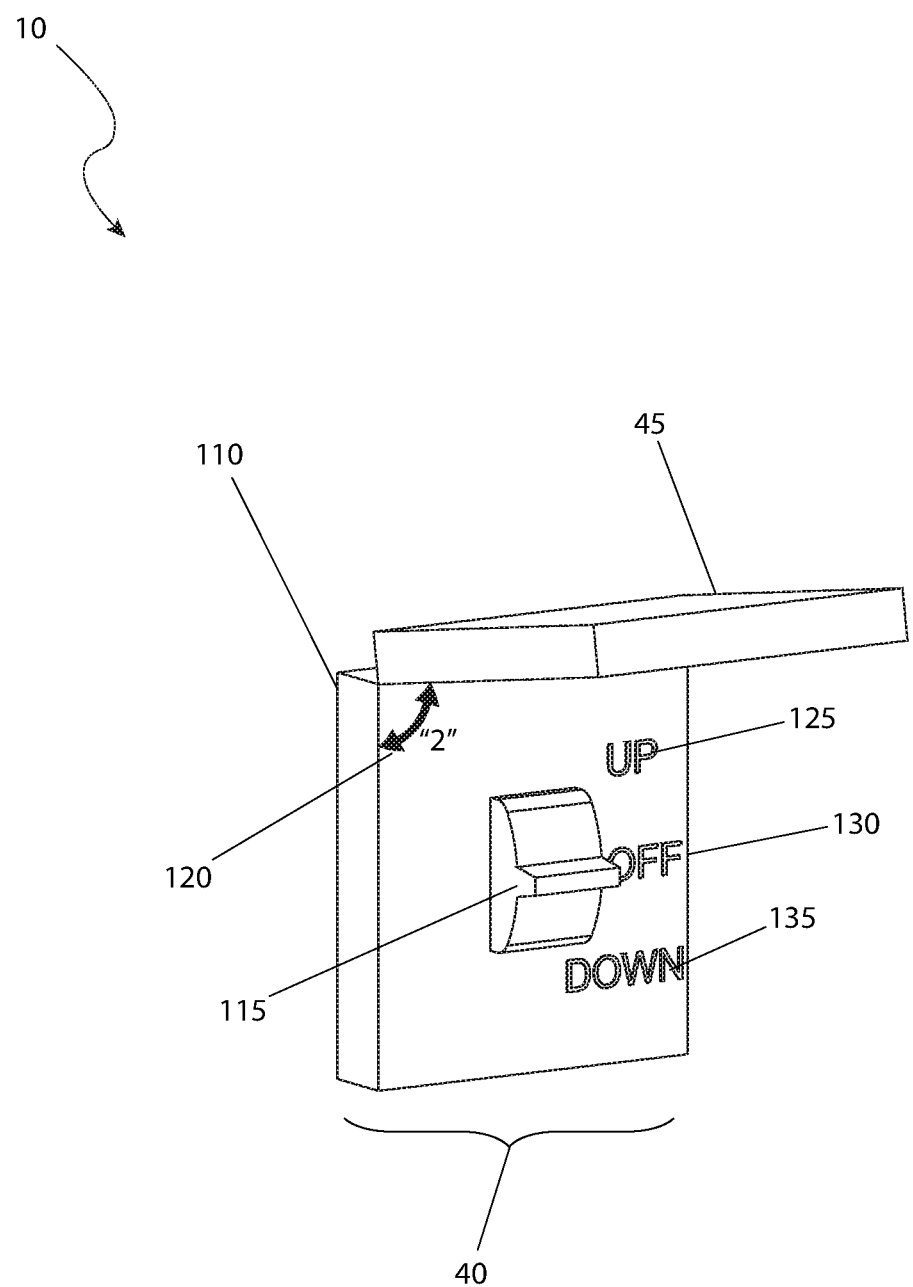
FIG. 4 is a perspective view of the control switch station as used with the electric operating device, according to the preferred embodiment of the present invention.

Referring next to FIG. 4, a perspective view of the control switch station 40 as used with the device 10, according to the preferred embodiment of the present invention is disclosed. The control switch station 40 is provided with a weatherproof housing 110 housing a double-pole/double-throw toggle switch 115. The double-pole/double-throw toggle switch 115 is envisioned to be a spring return-to-center OFF position. Further description of the double-pole/double-throw toggle switch 115 will be provided herein below. The weatherproof cover 45 swings along a radial travel path "2" 120 which may be raised up for access. When not in use, gravity will hold the weatherproof cover 45 in a downward position to protect the double-pole/double-throw toggle switch 115 from the elements. The double-pole/double-throw toggle switch 115 is provided with UP position 125 which raises (retracts) the extendable foot 65 (as shown in FIG. 2), an OFF position 130 which holds the extendable foot 65 at whatever position they are at when the double-pole/double-throw toggle switch 115 is placed in the OFF position 130, and a DOWN position 135 which lowers (extends) the extendable foot 65. Both the UP position 125 and the DOWN position 135 requires the operator to hold the double-pole/double-throw toggle switch 115 in the respective position. When released, the internal spring of the double-pole/double-throw toggle switch 115 will place it in the OFF position 130 position.

Figure 6:
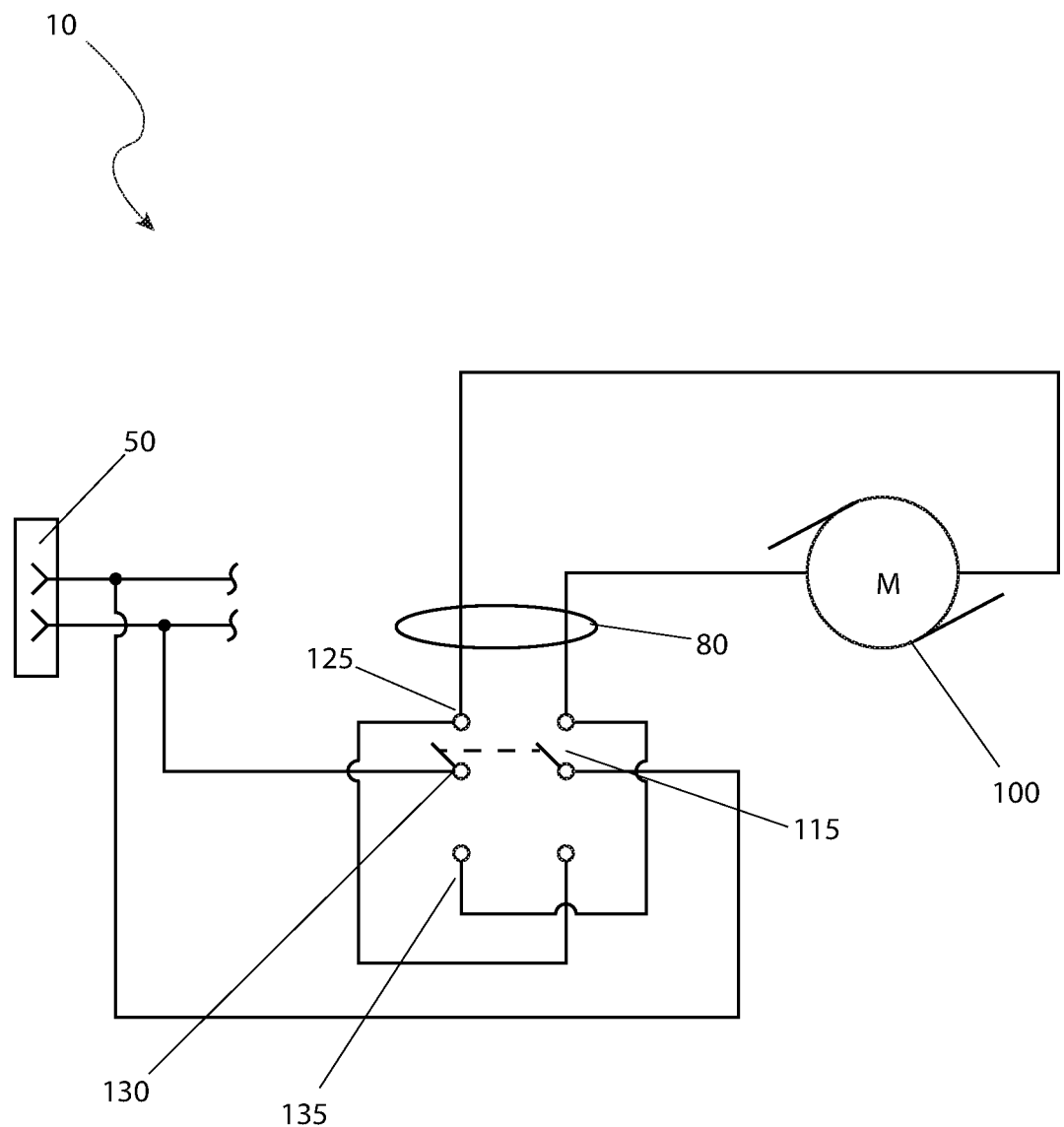
FIG. 6 is an electrical block diagram of the electric operating device, according to the preferred embodiment of the present invention.

Referring to FIG. 6, an electrical block diagram of the device 10, according to the preferred embodiment of the present invention is depicted. Electrical power for the device 10 is obtained from the electrical umbilical connection 50, using electrical connections that provide power when the trailer 15 is in a parked position. Power is then routed to the double-pole/double-throw toggle switch 115, where the double-pole/double-throw arrangement provides a well-known polarity reversing circuit to drive the DC electric motor 100 using the wiring connection 80. The UP position 125, the OFF position 130, and the DOWN position 135 are obtained by physical manipulation of the double-pole/double-throw toggle switch 115.

The preferred embodiment of the present invention can be utilized by the common user in a simple and effortless manner with little or no training. It is envisioned that the 10 would be constructed in general accordance with FIG. 1 through FIG. 6. The operator would procure the device 10 from conventional procurement channels such as a vehicle part and accessory stores, new and used vehicle dealers, part wholesalers, mechanical supply houses, mail order and internet supply houses and the like. Special attention would be paid to the specific style of landing gear assembly 20 upon which the device 10 is to be used to ensure mechanical and electrical compatibility.

After procurement and prior to utilization, the device 10 would be installed in the following manner: the landing gear assembly 20 would be bolted onto the frame of the trailer 15 using existing attachment means; the control switch station 40 would be placed on the side of the trailer 15 directly above the landing gear assembly 20 as in FIG. 1, or alternately mounted to a location in a tractor 14 hauling the trailer 15; and, electrical connections to the electrical umbilical connection 50, the control switch station 40, and the wiring connection 80 to the DC electric motor 100 would be made. At this point in time, the device 10 is ready for utilization.

During utilization of the device 10, the following procedure would be initiated: upon arriving at a loading or unloading location where the tractor 14 needs to leave the trailer 15 behind, the operator would raise the weatherproof cover 45 and operate the double-pole/double-throw toggle switch 115 in the DOWN position 135; once a satisfactory extension of the extendable foot 65 has been obtained, the operator would release the double-pole/double-throw toggle switch 115 allowing it to return to the OFF position 130. The double-pole/double-throw toggle switch 115 may then be disconnected following normal procedures. It is noted that the extendable foot 65 may also be lowered by a hand crank in a conventional manner using the hand crank coupling 75 if needed or desired. When the trailer is to be connected to a tractor 14 for towing, the initial coupling process is performed using well-known methods; next, the operator operates the double-pole/double-throw toggle switch 115 in the UP position 125 to raise the extendable foot 65; when fully retracted, the operator releases the double-pole/double-throw toggle switch 115 allowing it to return to the OFF position 130. At this point in time, one (1) complete usage cycle of the device 10 has been performed. Future repetitive usage may occur in a continuous manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. An electric operating device, comprising:
 a trailer having a side and a landing gear assembly, the landing gear assembly includes a driver's side support leg and a right-side support leg that are interconnected by a drive shaft;
 a drive motor housing disposed at an upper side of the driver's side support leg, the drive motor housing adjacent to a hand crank;
 a control switch station mounted on the side of the trailer directly above the landing gear assembly;
 a weatherproof cover providing environmental protection for the control switch station;
 an output bevel gear is axially connected to the drive shaft to allow for common equal driving of an extendable foot associated with the right-side support leg;
 a standard electrical umbilical connection providing electrical power for the electric operating device; and
 a wiring connection electrically connected to the drive motor housing, the wiring connection provides for electrical energization of the electric operating device;
 wherein the driver's side support leg is provided with a main bevel gear which is axially connected to the extendable foot to allow for motion along the first travel path;
 wherein the main bevel gear is driven by a first drive bevel gear that is axially connected to the hand crank coupling;
 wherein the main bevel gear is driven by first drive bevel gear that is axially connected to a second drive bevel gear that is connected to a DC electric motor located inside of the drive motor housing; and,
 wherein the control switch station is mounted on the side of the trailer directly above in a tractor hauling the trailer.

2. The electric operating device, according to claim 1, wherein the driver's side support leg and the right-side support leg each include the extendable foot.

3. The electric operating device, according to claim 2, wherein the drive shaft ensures that both of the extendable feet extend up and down along a first travel path simultaneously and in an equal manner.

4. The electric operating device, according to claim 2, wherein the drive motor housing provides for driving the extendable feet along the first travel path in the same manner as the hand crank connected to the hand crank coupling located at the hand crank.

5. The electric operating device, according to claim 2, wherein the hand crank is connected to a hand crank coupling drive the extendable foot to allow for backup redundant operation.

6. The electric operating device, according to claim 2, wherein the hand crank is connected to a DC electric motor to allow for backup redundant operation.

7. The electric operating device, according to claim 1, wherein an alternate control switch station is mounted on a dashboard of the tractor connected to the trailer.

8. The electric operating device, according to claim 1, wherein the control switch station is provided with a weatherproof housing that houses a double-pole/double-throw toggle switch.

9. The electric operating device, according to claim 8, wherein the double-pole/double-throw toggle switch is a spring return-to-center OFF position.

10. The electric operating device, according to claim 8, wherein the double-pole/double-throw toggle switch is provided in an UP position which raises the extendable foot, an OFF position which holds the extendable foot at a position they are at when the double-pole/double-throw toggle switch is placed in the OFF position, and a DOWN position which lowers the extendable foot.

11. The electric operating device, according to claim 10, wherein the UP position and the DOWN position requires the double-pole/double-throw toggle switch to be held in its respective position.

12. The electric operating device, according to claim 10, wherein the internal spring of the double-pole/double-throw toggle switch will place it in the OFF position.

13. The electric operating device, according to claim 10, wherein the weatherproof cover swings along a radial travel path which is raised up for access and gravity will hold the weatherproof cover in a downward position to protect the double-pole/double-throw toggle switch from one or more external elements when not in use.

14. The electric operating device, according to claim 1, wherein the standard electrical umbilical connection provides electrical power for a wide range of trailers and for a connected truck in a universal and interchangeable manner.

\* \* \* \* \*